Figure 4:
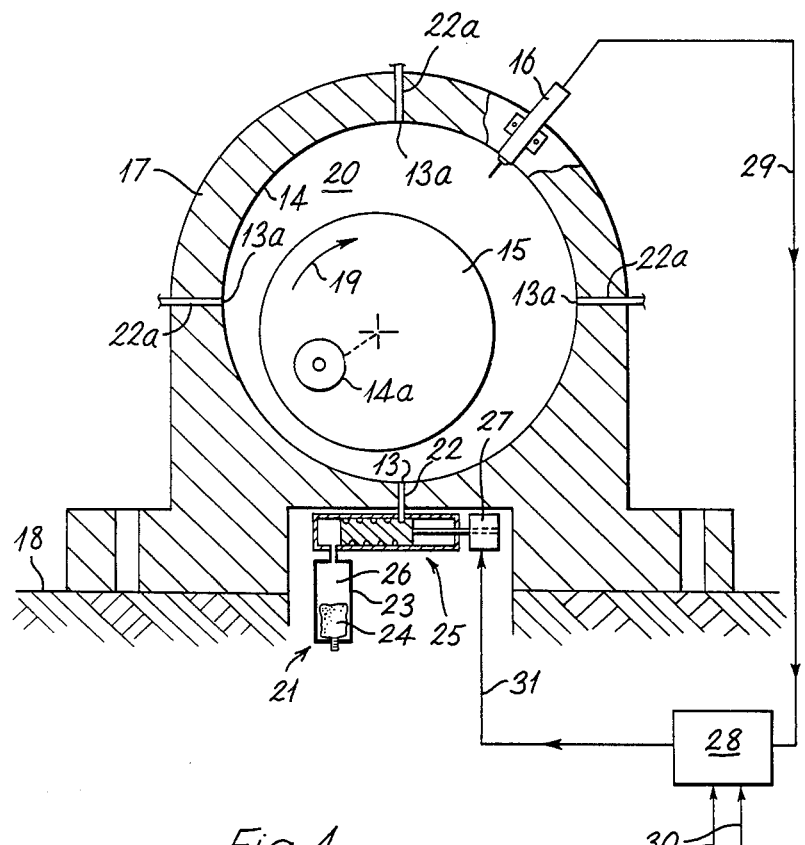

United States Patent [19]

Goodwin

[11] Patent Number: 4,767,223
[45] Date of Patent: Aug. 30, 1988

[54] HYDRODYNAMIC JOURNAL BEARINGS

[75] Inventor: Michael J. Goodwin, Walton Stone, England

[73] Assignee: National Research Development Corporation, London, England

[21] Appl. No.: 128,215

[22] Filed: Dec. 3, 1987

[30] Foreign Application Priority Data

Dec. 3, 1986 [GB] United Kingdom ................ 8628956

[51] Int. Cl.$^4$ ............................................. F16C 32/06
[52] U.S. Cl. ................................... 384/114; 384/100
[58] Field of Search ................ 384/99, 100, 114, 247, 384/448, 118, 428

[56] References Cited

U.S. PATENT DOCUMENTS

| | | | |
|---|---|---|---|
| 3,101,980 | 8/1963 | Love | 384/114 |
| 3,124,395 | 3/1964 | Sternlicht | 384/114 X |
| 3,560,064 | 2/1971 | Silver | 384/114 |
| 4,512,671 | 4/1985 | Giers et al. | 384/428 X |
| 4,643,592 | 2/1987 | Lewis et al. | 384/100 |
| 4,696,585 | 9/1987 | Swearingen | 384/118 X |

OTHER PUBLICATIONS

"The Effect of a 'Stabilizing Chamber' in the Suppression of Self-Excited Vibration Known as Pneumatic Hammer" by M. Yoshinaga, Mechanical Engineering Transactions, 12/1983 of the Institution of Engineers, Australia, pp. 8 to 15.
"Bessere Balance": article in *Fluid*, No. 1 (Jan. 1975), pp. 19 to 22.

*Primary Examiner*—Stuart S. Levy
*Assistant Examiner*—Thomas R. Hannon
*Attorney, Agent, or Firm*—Cushman, Darby & Cushman

[57] ABSTRACT

A hydrodynamic journal bearing in which a journal rotates within and with clearance relative to a bearing bush, the clearance being filled with a mass of fluid and the load of the journal being supported by the force exerted upon it by the fluid, substantially all of that force being generated by the relative motion of the journal, the fluid, and bush, rather than by means external to the working parts of the bearing. The annular clearance is connected to an undriven fluid accumulator by way of a variable resistance, and that resistance is varied in accordance with journal speed so as to counteract bearing vibration.

6 Claims, 2 Drawing Sheets

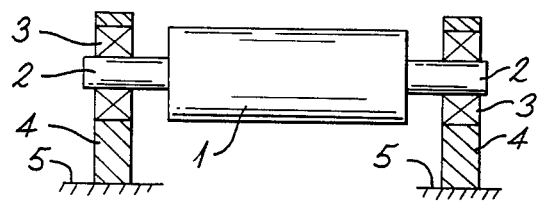
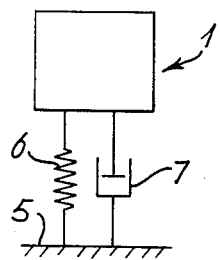
Fig. 1
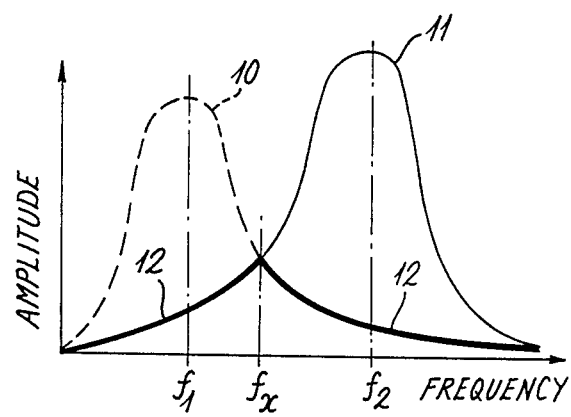
Fig. 2
Fig. 3
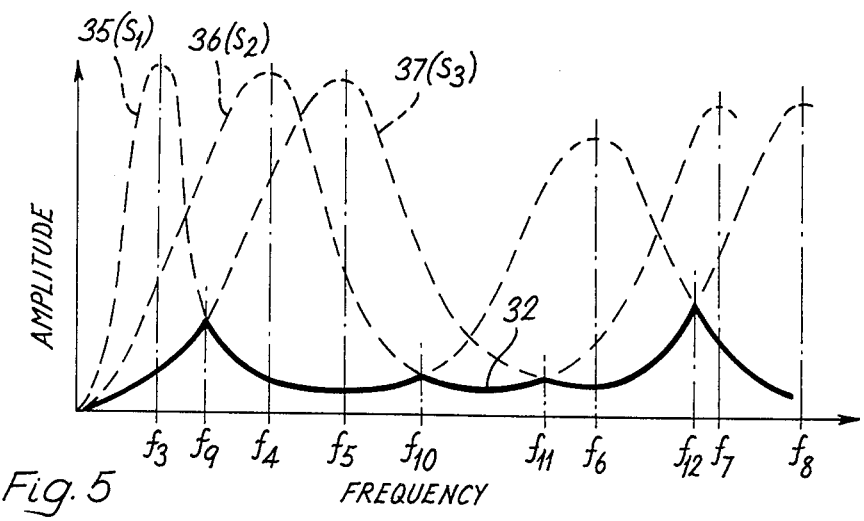
Fig. 5

HYDRODYNAMIC JOURNAL BEARINGS

This invention relates to hydrodynamic journal bearings, by which in this specification we mean fluid-filled bearings in which a journal rotates within and relative to a bearing bush, in which in use an annular clearance filled with the fluid separates journal and bush, and in which the load of the journal is supported by the force exerted upon it by the fluid, substantially all that force being generated, in steady state running of the bearing, by the relative motion of the journal and the bush rather than by means external to the working parts of the bearing, as is the case with hydrostatic bearings. In a hydrostatic journal bearing, the load of the journal is carried by pressure generated in the fluid within the bearing clearance by connecting that clearance to the delivery of a driven pump.

Lateral vibration—that is to say, vibration at right angles to the journal axis—in a hydrodynamic journal bearing generates noise and wear, and also cyclical bending of the shaft or other rotor which presents the journal and which the bearing supports. This leads to reduced fatigue life of all components. Some lateral vibration in such bearings is due to forces resulting from rotor unbalance and is always present to some degree, however the bearing is made and used. Other known forms of lateral vibration for instance oil whirl, oil whip and aerodynamic instability—are self-excited and less dependent on rotor unbalance. Whatever the origin of such vibrations, the displacement amplitude experienced by the journal of a hydrodynamic bearing is dependent on two factors amongst others. Firstly, the stiffness and damping effect of the fluid which supports the journal and separates it from the bearing bush and the foundations of the machine of which the bearing is a part. Secondly, the amplitude and the forcing frequency of the cyclical force which causes the vibration: this frequency is usually directly related to the speed of rotation of the journal.

FIG. 1 of the accompanying drawings is a diagrammatic radial section through machinery comprising a rotor 1 supported at opposite ends by journals 2 running in bearings 3 which are mounted in supports 4 themselves resting on a foundation 5.

FIG. 2 illustrates such a mechanical system, in a more simplified and schematic way, as a spring-mass-damper system with a single degree of freedom, in which a spring 6 and damper 7 are interposed between the rotor 1 and the foundation 5.

FIG. 3 illustrates graphically how the amplitude of lateral vibration of such a rotor varies with the frequency of the cyclical force giving rise to that vibration—that is to say, to the frequency of revolution of the rotor in a system as shown having a single degree of freedom. As is clearly shown, the amplitude rises to a maximum as the speed of rotation of the rotor rises to attain its critical value (at which the frequency of revolution equals the natural frequency of the rotor in lateral vibration) and then falls away as the speed of rotation rises further. Function 10 indicates the typical variation of amplitude where the critical speed of the rotor is $f_1$ and where the rotor support is of low stiffness, and function 11 indicates the comparable variation of amplitude where the critical speed is $f_2$ and the support is of high stiffness.

The present invention arises from appreciating that if the support stiffness of the system illustrated in FIG. 3 were changed at rotor speed $f_x$, so that high stiffness was maintained at lower values of rotor speed and low stiffness at higher values, then the amplitude of lateral vibration would follow first one function and then the other, as represented by the heavy line 12, with a maximum value far less than that of either of functions 10 and 11.

The invention is a hydrodynamic journal bearing as hereinbefore defined, in which the annular clearance is connected to at least one undriven fluid accumulator by way of a conduit presenting a variable resistance to fluid flow, in which there are means to generate functions representing the relationship between journal speed and bearing vibration for at least two different stiffnesses of the fluid support, and in which there are means responsive to instantaneous journal speed to vary the conduit resistance so that the bearing operates according to the function in which that instantaneous journal speed correlates with the least vibration. The accumulator may comprise a closed chamber partly filled by an electric mass, and the elastic mass may be in form of a flexible and gas-filled bag.

The variable resistance presented by the conduit may include zero resistance at one extreme and may include a variable capillary restrictor.

The bearing may be arranged with the bearing axis horizontal and with the conduit entering the bearing clearance at its lowest point. The invention also includes bearings in which separate conduits, entering the annular clearance at different positions which may lie in a common radial plane and which may be located symmetrically within that plane, connect the clearance to a plurality of accumulators.

There may be means to generate functions of the relationship of vibration to rotor speed at all stiffnesses lying within a predetermined stiffness range, whereby as a rotor speed varies continuously the conduit resistance may vary continuously in response.

The invention will now be described, by way of example, with reference to the further figures of accompanying drawings in which:

FIG. 4 is a diagrammatic section through a hydrodynamic journal bearing and associated parts, some parts being shown schematically, and FIG. 5 is similar to FIG. 3, but illustrates an application of the invention to a system with more than one degree of freedom.

FIG. 4 shows a hydrodynamic journal bearing comprising a journal 15 driven by a motor 14a, and rotatable within a bearing bush 17 supported on a foundation 18. The off-centre position of the journal 15 is what it will typically adopt in use when rotating clockwise as indicated by arrow 19. The annular clearance 20 between journal and bush is filled with lubricant and is in communication with an accumulator 21 by way of a conduit 22 presenting a mouth 13 in the inner wall 14 of bush 17. Accumulator 21 comprises a closed chamber 23 partly filled by an elastic mass in the form of a closed flexible bag 24 filled with gas. A variable flow restrictor 25 is mounted within the length of conduit 22. The illustrated restrictor 25 is of the "screw thread" capillary type, but it will be appreciated that variable restrictors of many other known types could be used instead. The entire length of the conduit and the entire free space 26 within accumulator 21 are, like the clearance 20, filled with fluid. Conduits 22a presenting mouths 13a indicate the arrangement that might exist if the clearance were connected to four accumulators 21 instead of to the single one shown.

Mechanism 27, operable to vary the fluid flow resistance presented by restrictor 25, is controlled by the output 31 of a processor 28 which receives a number of input signals, including a signal from a displacement sensor 16 by way of line 29. This signal is processed, in known manner, to generate an indication of the frequency and amplitude of lateral vibration of journal 15, and so of its speed of rotation. Further inputs, by way of lines 30, generate within the processor functions representing the relationship between journal speed and lateral journal vibration for at least two different stiffnesses of fluid support, each function covering a working range of journal speed.

The functions 35, 36 and 37 in FIG. 5 represent the variation with rotor speed of the amplitude of lateral vibration of journal 15, for three different stiffnesses $s_1$, $s_2$ and $s_3$ respectively of the support provided for the journal by the fluid within clearance 20. These three stiffnesses are in ascending order of magnitude, $s_1$ being least and $s_3$ greatest. Because there is now more than the single degree of freedom of the simple system of FIG. 3, stiffness $s_1$ leads to peaks of lateral vibration at a first critical frequency $f_3$ and a second critical frequency $f_6$ and the corresponding peaks for stiffness $s_2$ and $s_3$ occur at $f_4$ and $f_7$, and $f_5$ and $f_8$ respectively. Yet further peaks for each stiffness, at higher frequency values, are of course possible according to the number of degrees of freedom present, but they would lie beyond the maximum frequency value shown in FIG. 5. In the system shown in FIG. 4, the stiffnesses of support provided for journal 15 by the clearance fluid can clearly be changed by variation of the flow resistance which the fluid has to overcome to pass to and fro between clearance 20 and accumulator 21. This can be achieved simply by operation of mechanism 27 to vary the resistance presented by restrictor 25. Assume that the bearing of FIG. 4 is the multi-degree-of-freedom system to which FIG. 5 relates, and that input 30 to processor 28 programs it with functions 34–37 while the input by way of line 29 enters the instantaneous speed of rotor 15. Output 31 reflects those two inputs, and if it operates mechanism 27 to vary restrictor 25 so that the fluid within clearance 20 operats at stiffness $s_3$ for rotor speeds between zero and $f_9$, $s_1$ from speed $f_9$ to speed $f_{10}$, $s_2$ from $f_{10}$ to $f_{11}$, $s_3$ again from $f_{11}$ to $f_{12}$, and $s_1$ again above $f_{12}$ to the boundary of the Figure, it will be seen that the amplitude of vibration follows the heavy line 32 and so avoids the high peaks of functions 35–37.

FIG. 5 illustrates the performance of a bearing according to the invention in which the control system, particularly the processor 28, is programmed only with certain discrete vibration/journal speed functions such as items 35–37. It will be apparent that if a more sophisticated control system is provided and is programmed with a continuous spectrum of such functions over a predetermined speed range, the output 31 of the processor 28 could then control the mechanism 27 so that the resistance of restrictor 25 varied continuously in response to like variation of journal speed, resulting in a vibration profile of smoother shape than line 32 and with even smaller peak amplitudes.

Not only is the hydrodynamic bearing of this invention to be distinguished from a hydrostatic bearing by the fact that in the latter the bearing clearance is connected to a driven external source of pressure, whereas in the former the clearance is connected to an undriven accumulator which can only respond to changes occurring within the clearance. In a hydrostatic bearing the conduit connecting each pump to the clearance terminates in a recess or "pad" of substantial area formed in the stator of the bearing and confronting the rotor, and the force which the pumped fluid exerts on the rotor is related to the product of the pad area and the pressure of the fluid within the pad. In the hydrodynamic bearing of this invention such a major recess or pad would be counterproductive. The cross-section of the mouth 13 by which the conduit 22 enters the inner wall 14 of the bush 17 is comparable with the cross-section of the conduit itself, and in the embodiment shown in the drawings creates no substantial interruption to the smooth cylindrical shape of that inner wall.

Another difference is that in the flowing conditions which exist within a pumped hydrostatic system, the conduit connecting the pump to the bearing clearance must present at least a significant, finite resistance to flow. In the hydrodynamic bearing of the present invention, in which the accumulator is responsive, not driven, the minimum value of the variable resistance (item 25, FIG. 4) need not be significant and will typically be as close to zero as possible.

We claim:

1. A hydrodynamic journal bearing comprising:
a bearing bush;
a mass of fluid;
a journal presenting an axis of rotation and rotatable within and relative to said bearing bush, whereby in use an annular clearance filled with said fluid separates said journal from said bush;
said mass of fluid being isolated from any source of fluid power external to said bearing, whereby in use the load of said journal is supported by the force exerted upon it by said mass of fluid, substantially all that force being generated in steady stage running of the bearing by the relative motion of said journal, said bush, and said fluid;
an undriven fluid accumulator;
a conduit presenting a variable resistance to fluid flow, and connecting said annular clearance to said undriven fluid accumulator;
means to generate functions representing the relationship between the speed of said journal and the vibration of said bearing for at least two different stiffnesses of said support provided by said mass of fluid, and
means responsive to the instantaneous speed of said journal to vary said resistance of said conduit so that said bearing operates according to said function in which said instantaneous speed of said journal correlates with the least said vibration.

2. A hydrodynamic journal bearing according to claim 1 in which said fluid accumulator comprises a closed chamber, and in which an elastic mass partly fills said closed chamber.

3. A hydrodynamic journal bearing according to claim 2 in which said elastic mass has the form of a flexible, gas-filled bag.

4. A hydrodynamic journal bearing according to claim 1 in which said variable resistance presented by said conduit includes a variable capillary restrictor.

5. A hydrodynamic journal bearing according to claim 1 in which said journal axis is horizontal, and which said conduit enters said annular clearance at the lowest point of said clearance.

6. A hydrodynamic journal bearing according to claim 1 including means to generate said functions of said relationship of vibration to journal speed over a continuum of stiffnesses lying within a predetermined range of said stiffness, whereby as the speed of said journal various continuously the resistance of said conduit may vary continuously in response.

* * * * *